(12) United States Patent
Lawande et al.

(10) Patent No.: US 10,007,686 B2
(45) Date of Patent: Jun. 26, 2018

(54) AUTOMATIC VERTICAL-DATABASE DESIGN

(75) Inventors: Shilpa Lawande, Nashua, NH (US);
Alexander Rasin, Portland, ME (US);
Omer Trajman, Cambridge, MA (US);
Stanley B. Zdonik, Westwood, MA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 2217 days.

(21) Appl. No.: 11/461,926

(22) Filed: Aug. 2, 2006

(65) Prior Publication Data
US 2008/0040348 A1    Feb. 14, 2008

(51) Int. Cl.
*G06F 17/30* (2006.01)

(52) U.S. Cl.
CPC .. *G06F 17/30312* (2013.01); *G06F 17/30315* (2013.01)

(58) Field of Classification Search
CPC .................................................. G06F 17/30315
USPC .................................... 707/5, 715, 803, 974
See application file for complete search history.

(56) References Cited

U.S. PATENT DOCUMENTS

| | | | |
|---|---|---|---|
| 5,345,585 A | | 9/1994 | Iyer et al. |
| 5,423,037 A | * | 6/1995 | Hvasshovd .................. 707/202 |
| 5,794,228 A | | 8/1998 | French et al. |
| 5,794,229 A | * | 8/1998 | French et al. .................... 707/2 |
| 5,878,409 A | * | 3/1999 | Baru et al. ........................ 707/2 |
| 5,918,225 A | * | 6/1999 | White et al. ...................... 707/3 |
| 5,960,423 A | * | 9/1999 | Chaudhuri et al. ............... 707/2 |
| 6,009,432 A | | 12/1999 | Tarin |
| 6,029,163 A | * | 2/2000 | Ziauddin .......................... 707/2 |
| 6,105,020 A | | 8/2000 | Lindsay et al. |
| 6,421,687 B1 | * | 7/2002 | Klostermann ................ 707/202 |
| 6,801,903 B2 | * | 10/2004 | Brown et al. ..................... 707/2 |
| 6,879,984 B2 | | 4/2005 | Duddleson et al. |
| 7,024,414 B2 | * | 4/2006 | Sah et al. ...................... 707/101 |
| 7,139,783 B2 | | 11/2006 | Hinsaw et al. |
| 7,281,004 B2 | * | 10/2007 | Lightstone et al. |

(Continued)

OTHER PUBLICATIONS

Zilio et al., DB2 Design Advisor: Integrated Automatic Physical Database Design, Proc. 30th VLDB Conference, Toronto, Canada, Sep. 2004, p. 1087-1097.*

(Continued)

*Primary Examiner* — Jeff A Burke

(57) ABSTRACT

An automatic physical-layout designer for a database-management system determines the database's physical layout from a set of training queries, the database's logical design, and a parameter k that indicates how many storage nodes can be lost without losing access to any of the data. The designer lays the database out as a column store such that the stored columns constitute redundant projections on the system's different storage nodes. It repeatedly identifies a projection, whose addition to the design will result in the greatest performance improvement for the training queries. In doing so, it takes into account the different compression formats to which the different projections lend themselves. When a projection has been identified as one to be added, it is added on one node, and k projections having the same columns are added to other nodes. The designer continues thus adding projections until a space budget has been reached.

30 Claims, 9 Drawing Sheets

(56) References Cited

U.S. PATENT DOCUMENTS

| | | | |
|---|---|---|---|
| 7,464,247 | B2 | 9/2008 | Uppala |
| 7,483,918 | B2* | 1/2009 | Chaudhuri et al. ......... 707/104.1 |
| 2004/0260684 | A1* | 12/2004 | Agrawal et al. ................... 707/3 |
| 2005/0065939 | A1 | 3/2005 | Miao |
| 2005/0187917 | A1* | 8/2005 | Lawande et al. ................. 707/3 |
| 2005/0187977 | A1* | 8/2005 | Frost .......................... 707/104.1 |
| 2005/0203940 | A1* | 9/2005 | Farrar et al. ................... 707/102 |
| 2005/0283658 | A1* | 12/2005 | Clark et al. ...................... 714/11 |
| 2006/0085484 | A1* | 4/2006 | Raizman et al. ............... 707/200 |
| 2006/0184338 | A1* | 8/2006 | Lightstone et al. ........... 702/182 |
| 2006/0253473 | A1* | 11/2006 | Agrawal et al. .............. 707/100 |
| 2006/0282423 | A1 | 12/2006 | Al-Omari et al. |
| 2007/0027904 | A1 | 2/2007 | Chow et al. |
| 2007/0067261 | A1* | 3/2007 | Burger et al. ...................... 707/2 |
| 2008/0033914 | A1 | 2/2008 | Cherniack et al. |
| 2008/0281784 | A1 | 11/2008 | Zane et al. |

OTHER PUBLICATIONS

Stonebraker et al., C-Store: A column-Oriented DBMS, Proc. 31st VLDB Conference, Trondheim, Norway, 2005.*

Tian-Lei et al., Automatic Relational database Compression Scheme Design based on Swarm Evolution, Journal of Zhejiang University, published Apr. 5, 2006.*

Agrawal et al, Integrating Vetical and Horizontal Partitioning into Automated Physical Database Design, SIGMOD, Jun. 13, 2004.*

Wikipedia, Definition of Database Index, downloaded Oct. 20, 2011.*

Abadi et al., "Integrating Compression and Execution in Column-Oriented Database Systems", SIGMOD 2006, published Jun. 2006, pp. 671-683.*

Abadi et al., "Materialization Strategies in a Column-Oriented Dbms," *Proceedings of ICDE*, 2007, Istanbul, Turkey, 10 pages.

Abadi, Daniel, "Redefining Physical Data Independence," *Proceedings of CIDR*, Jan. 2007, 6 pages.

Agrawal et al., "Automated Selection of Materialized Views and Indexes for SQL Databases," *Proceedings of the 26th International Conference on Very Large Databases*, Cairo, Egypt, 2000, pp. 496-505.

Baralis et al., "Materialized View Selection in a Multidimensional Database," in *Proceedings of the 23rd VLDB Conference*, Athens, Greece, 1997, pp. 156-165.

Chaudhuri et al., "An Efficient Cost-Driven Index Selection Tool for Microsoft SQL Server," Proceedings of the 23rd VLDB Conference Athens, Greece, 1997, pp. 146-155.

Gupta et al., "Selection of Views to Materialize under a Maintenance-Time Constraint," International Conference on Database Theory (ICDT), 1999, 453-470.

"IBM Universal Database for Linux, Unix, and Windows," Product Manual, Version 7, 68 pages, http://www-306.ibm.com/software/data/db2/udb/suggort/manualsv7.html.

"IBM Universal Database for Linux, Unix, and Windows," Product Manual, Version 7.2, 94 pages, http://www-306.ibm.com/software/data/db2/udb/support/manualsv7.html.

Ioannidis et al., "Left-Deep vs. Bushy Trees: An Analysis of Strategy Space and ITS Implications for Query Optimization," Computer Sciences Department, University of Wisconsin, Madison, WI, 1991, pp. 168-177.

Ono et al., "Measuring the Complexity of Join Enumeration in Query Optimization," *Proceedings of the 16th VLDB Conference*, Brisbane, Australia, Aug. 13-16, 1990), pp. 314-325.

Papadomanolakis et al., "AutoPart: Automating Schema Design for Large Scientific Databases Using Data Partitioning," *Proc. 16th International Conference on Scientific and Statistical Database Management* (SSDBM 2004), Santorini Island, Greece, Jun. 2004, 10 pages.

Pellenkoft et al., "The Complexity of Transformation-Based Join Enumeration," *Proceedings of the 23rd VLDB Conference*, Athens, Greece, 1997, pp. 306-315.

Schemas, Oracle8i Data Warehousing Guide, 1999, 8 pages.

Schemas Modeling Techniques, Oracle Database Data Warehousing Guide, 2001, 24 pages.

Selinger et al., "Access Path Selection in a Relational Database Management System," IBM's System R Optimizer, *Proceedings of the ACM SIGMOD Conference on the Management of Data*, Boston, MA, May 1979), pp. 23-34.

Tao et al., "Optimizing Large Star-Schema Queries with Snowflakes via Heuristic-Based Query Rewriting," IBM Canada Ltd., 2003, pp. 1-15.

Valentin et al., "DB2 Advisor: An Optimizer Smart Enough to Recommend Its own Indexes," *Proc. ICDE Conf.*, 2000, pp. 101-110.

Vance et al., "Rapid Bush Join-Order Optimization with Cartesian Products," *Proceedings of the 1996 ACM SIGMOD International Conference on Management of Data*, Montreal, Quebec, Canada, Jun. 4-6, 1996), pp. 35-46.

International Search Report and Written Opinion for PCT Application No. PCT/US07/74740, dated Jul. 3, 2008.

International Search Report and Written Opinion for PCT Application No. PCT/US07/74741, dated Jul. 24, 2008.

Galindo-Legaria, Cesar A. et al. "Outerjoin Simplification and Reordering for Query Optimization," ACM Trans. Database Syst. 22(1) pp. 43-73 (1997).

Piraheash, Hamid et al. "Extensible/Rule Based Query Rewrite Optimization in Starburst," IBM Almaden Research Center, San Jose, CA, pp. 39-48.

Uno, Takeaki "An Algorithm for Enumerating all Directed Spanning Trees in a Directed Graph," In Proceedings of the 7th International Symposium on Algorithms and Computation, Lecture Notes in Computer Science; vol. 1178, 1996, pp. 166-173.

International Preliminary Report on Patentability for PCT Application No. PCT/US07/74740, dated Feb. 12, 2009.

International Preliminary Report on Patentability for PCT Application No. PCT/US07/74741, dated Feb. 12, 2009.

"Adabas-Rapid Demonstration Databases, " Statistics Canada, Demonstration Databases, Jun. 1978, 38 pages.

Ailamaki et al., "Weaving Relations for Cache Performance," Proceedings of the 27th VLDB Conference, Roma, May 2001, 12 pages.

Alsberg, Peter A. ,"Space and Time Savings Through Large Data Base Compression and Dynamic Restructuring," Proceedings of the IEEE vol. 63, No. 8, Aug. 1975, 9 pages.

"An Introduction to Multidimensional Database Technology," Kenan Systems Corporation, 1993-1995, 29 pages.

Andersson, "A Study of Modified Interpolation Search in Compressed, Fully Transposed, Ordered Files," Proceedings of the 4th International Conference on Statistical and Scientific Database Management, 1988, 13 pages.

Apache Cassandra "Data Model" [online], [retrieved on May 29, 2009]. Retrieved from the Internet <URL: http://cwiki.apache.org/confluence/display/CSDR/Pata+Model >, 2 pages.

Baker, Margaret, "User's Guide to the Berkeley Transposed File Statistical System," Survey Research Center Technical Report Number One, Jan. 1974, 132 pages.

Batory, D. S., "On Searching Transposed Files," ACM Transactions on Database Systems, vol. 4, No. 4, Dec. 1979, 14 pages.

Bleier et al., "File Organization in the SDC Time-Shared Data Management System (TSMS)," North-Holland Publishing Company, 1969, 8 pages.

Boral et al., "Prototyping Bubba, A Highly Parallel Database System," IEEE Trans. on Knowledge and Data Engineering, Mar. 1990, 21 pages.

Brun et al., "Visualization of Scientific Data for High Energy Physics. PAW++, KUIP, PIAF: General-Purpose Portable Software Tools for Data Analysis and Presentation," European Organization for Nuclear Research, 1993, 12 pages.

Burnett et al., "Data Management Support for Statistical Data Editing and Subset Selection," Proceedings of the 1st LBL Workshop on Statistical Database Management, 1981, 15 pages.

Cochinwala et al., "A Multidatabase System for Tracking and Retrieval of Financial Data," Proceedings of the 20th VLDB Conference Santiago, Chile, 1994, 8 pages.

(56) References Cited

OTHER PUBLICATIONS

Cohen et al., MAD Skills: New Analysis Practices for Big Data [online], [retrieved May 29, 2009]. Retrieved from the Internet <URL: http://db.cs.berkeley.edu/papers/vldb09-madskills.pdf>, 12 pages.

Cornell, "A Vertical Partitioning for Relational Databases," IBM Thomas J. Watson Research Center, 1987, 8 pages.

Cornell et al., "An Effective Approach to Vertical Partitioning for Physical Design of Relational Databases," IEEE Transactions on Software Engineering, vol. 16, No. 2, Feb. 1990, 11 pages.

Cressman, "Analysis of Data Compression in the DLT2000 Tape Drive," Digital Technical Journal vol. 6, No. 2, 1994, 17 pages.

Date, C. J., "An Introduction to Database Systems, vol. 1," Addison-Wesley Publishing Company, 1990, 400 pages.

DBMS2—The secret sauce to Clearpace's compression [online], [retrieved May 29, 2009]. Retrieved from the Internet <URL: http://www.dbms2.com/2009/05/14/the-secret-sauce-to-clearpaces-compression/>, 6 pages.

Elmasri et al., "Fundamentals of Database Systems." The Benjamin/Cummings Publishing Company, Inc., 1989.

Farsi et al., "A Relational Database for Efficient Processing of Statistical Queries," Proceedings of the Second International Workshop on Statistical Database Management, 1983, 9 pages.

Goil et al., "Sparse Data Storage of Multi-Dimensional Data for OLAP and Data Mining," Department of Electrical & Computer Engineering Center for Parallel and Distributed Computing, 1994, 26 pages.

Goldstein, Andrew C. "Files-11, On-Disk Structure Specification," Digital Equipment Corporation, Jan. 15, 1979, 104 pages.

Greenplum—Greenplum Database 3.3—Features [online], [retrieved Jul. 13, 2009]. Retrieved from the Internet <URL: http://www.greenplum.com/products/features/>, 6 pages.

Hammer et al., "A Heuristic Approach to Attribute Partitioning," Laboratory for Computer Science, 1979, 9 pages.

Hawthorn, Paula, "Microprocessor Assisted Tuple Access, Decompression and Assembly for Statistical Database Systems," Proceedings of the $8^{th}$ VLDB, 1982, pp. 223-233.

Inmon et al., "The Dynamics of Data Base," Prentice Hall, 1986.

Khoshafian et al., "Efficient Support of Statistical Operations," IEEE Trans. On Software Engineering, vol. SE-11, No. 10, Oct. 1985, 13 pages.

Khoshafian et al., "A Query Processing Strategy for the Decomposed Storage Model," Microelectronics and Computer Technology Corporation, 1987, pp. 636-643.

Kickfire "The First Analytic Appliance for the Mass Market, Blog comment," [online], (retrieved on Aug. 6, 2009). Retrieved from the Internet: <URL: http://www.kickfire.com/blog/?p-392>, 4 pages.

Korth et al., "Database System Concepts," Second Edition, McGraw-Hill, Inc., 1991.

Mar., "On the Selection of Efficient Record Segmentations and Backup Strategies for Large Shared Databases," ACM Transactions on Database Systems, vol. 9, No. 3, Sep. 1984, 30 pages.

McCarthy, J. L., "Enhancements to the Codata Data Definition Language," Feb. 1982.

McKusick et al., "A Fast File system for UNIX," Computer ACM Transactions on Computer Systems 2, 3 (Aug. 1984), pp. 181-197.

Muthuraj et al., "A Formal Approach to the Vertical Partitioning Problem in Distributed Database Design," CIS Department University of Florida and College of Computing Georgia, a Technical paper, 1992, 24 pages.

Naeker, Philip A. H. "Real-World Interoperability", Part 4, RDBMS Maturity, vol. 10, No. 12, Nov. 1991, 8 pages.

Navathe et al., "Vertical Partitioning Algorithms for Database Design," ACM Transactions on Database Systems, vol. 9, No. 4, Dec. 1984, 31 pages.

Navathe, et al., "Vertical Partitioning for Database Design: A Graphical Algorithm," Database Systems Research and Development Center, 1989, 11 pages.

O'Neil, Patrick E., "Model 204 Architecture and Performance," Presented at $2^{nd}$ International Workshdp on High Performance Transaction Systems, Sep. 1987, 21 pages.

"RAPID Database Creation," Statistics Canada, 1978, 76 pages.

"RAPID Database Retrieval Manual," Statistics Canada, 1978, 46 pages.

"RAPID DBMS Manual," Statistics Canada, 1978, 16 pages.

"RAPID File Design Manual," Statistics Canada, 1978, 56 pages.

"RAPID Language Reference," Statistics Canada, 1978, 134 pages.

"RAPID Programmers Guide," Statistics Canada, 1978, 100 pages.

Richardson, "Supporting Lists in a Data Model (A Timely Approach)," Proceedings of the $18^{th}$ VLDB Conference Vancouver, British Columbia, Canada, 1992, 12 pages.

"Sadas Brochure," Advanced Systems s.r.l., 5 pages.

"Sadas QA," Advanced Systems s.r.l., 2 pages.

Schaffner et al., "A Hybrid Row-Column OLTP Database Architecture for Operational Reporting" [online], [retrieved on May 29, 2009]. Retrieved from the Internet <URL: http://www.vldb.org/conf/2008/workshops/WProc_BIRTE/p7-schaffner.pdf>, 14 pages.

Schek, Hans-Joerg, "Information Retrieval with APL by Adaptive Index and User Guidance," Information Retrieval with APL, 1980, 8 pages.

Seshadri et al., "Sequence Query Processing," SIGMOD 94, ACM, pp. 430-441.

Shasha, Dennis E. "Database Tuning," Prentice Hall PTR, 1992.

Shoshani et al., "Statistical Databases: Characteristics, Problems, and Some Solutions," Proceedings of the Eighth International Conference on Very Large Data Bases, Sep. 1982, 12 pages.

Stonebraker, Michael, Readings in Database Systems, Second Edition, Morgan Kaufmann, 1994.

Tanaka, "A Data-stream Database Machine with Large Capacity," Advanced Database Machine Architecture, 1983, 37 pages.

Thomas et al., "ALDS Project: Motivation, Statistical Database Management Issues, Perspectives, and Directions," Proceedings of the $2^{nd}$ International Workshop on Statistical Database Management, 1983, 7 pages.

Tsuda et al., "Transposition of Large Tabular Data Structures with Applications to Physical Database Organization—Part I. Transposition of Tabular Data Structures and Part II. Applications to Physical Database Organization," ACTA Information, vol. 19, 1983, 41 pages.

Turner et al., "A DBMS for Large Statistical Databases," Statistics Canada, 1979, pp. 319-327.

Weeks et al., "Flexible Techniques for Storage and Analysis of Large Continuous Surveys," Proceedings of the First LBL Workshop on Statistical Database Management, Mar. 1982.

Wong et al., "Bit Transposed Files," Proceedings of VLDB 85, Stockholm, 1985, 10 pages.

Wiederhold, Gio, "Database Design," McGraw-Hill Book Company, 1983.

Abadi et al., "Column-Stores vs. Row-Stores: How Different Are They Really?" SIGMOD '08, Jun. 9-12,2008, Vancouver, British Columbia, 14 pages.

Abadi, Daniel, "A Tour Through Hybrid Column/row-Oriented DBMS Schemes," [online], [retrieved Sep. 9, 2009]. Retrieved from Internet: <URL: http://dbmsmusings.blogspot.com/2009/09/tour-through-hybrid-columnrow-oriented.html>, 10 pages.

Abadi, Daniel, "Watch Out for VectorWise," [online], [retrieved Sep. 9, 2009]. Retrieved from Internet: <URL: http://dbmsmusings.blogspot.com/2009/07/watch-out-for-vectorwise.html>, 9 pages.

Boncz et al., "MonetDB/X100: Hyper-Pipelining Query Execution," Proceedings of the 2005 CIDR Conference, 13 pages.

Cudre-Mauroux et al., "The Case for RodentStore, an Adaptive, Declarative Storage System," $4^{th}$ Biennial Conference on Innovative Data Systems Research (CIDR), Jan. 4-7, 2009, Asilomar, California, 7 pages.

DBMS2—"Pax Analytica? Row- and Column-Stores Begin to Come Together," [online], (retrieved o Sep. 9, 2009). Retrieved from Internet: <URL: http://www.dbms2.com/2009/08/04/pax-analytica-row-and-column-stores-begin-to-come-together/> 7 pages.

(56) References Cited

OTHER PUBLICATIONS

Hankins et al., "Data Morphing: An Adaptive, Cache-Conscious Storage Technique," Proceedings of the 29$^{th}$ VLDB Conference, Berlin, Germany, 2003, 12 pages.
Howard, Philip, "The optimal warehouse," [online], (retrieved on Sep. 9, 2009]. Retrieved from Internet: <URL: http://www.it-director.com/technology/data_magmt/content.php?cid-11453 >, 2 pages.
Shao et al., "Clotho: Decoupling Memory Page Layout from Storage Organization," Carnegie Mellon University, Proceedings of the 30$^{th}$ VLDB Conference, Toronto, Canada, 2004, 12 pages.
Townsend et al., "Lowering Your IT Costs with Oracle Database 11g Release 2," An Oracle Corporation White Paper, Sep. 2009, 23 pages.
Zhou et al., A Multi-resolution Block Storage Model for Database Design, Proceedings of the Seventh International Database Engineering and Applications Symposium (Ideas '03), 4 pages.
Zukowski et al., DSM vs. NSM : CPU Performance Tradeoffs in Block-Oriented Query Processing, Proceedings of the Fourth International Workshop on Data Management on New Hardware, Jun. 13, 2008, Vancouver, Canada, 8 pages.
Authorized officer Katrin Sommermeyer, International Search Report and Written Opinion for PCT/US2010/023216, dated Aug. 3, 2010, 16 pages.
Son, J.H., et al., "An Adaptable Vertical Partitioning Method in Distributed Systems," Journal of Systems and Software, Elsevier North Holland, New York, NY, US LNKD-DOI:10.1016/J.JSS. 2003.04.002, vol. 73, No. 3, Nov. 1, 2004, pp. 551-561, XP004560798 ISSN:0164-1212.
Steinbrunn, et al., "Heuristic and Randomized Optimization for the Join Ordering Problem," VLDB Journal, Spring Verlag, Berlin, DE LINKD—DOI:10.1007/S00778005040, vol. 6, No. 3, Aug. 1, 1997, pp. 191-208, XP000957755, ISSN:1066-8888, the whole document.
Supplementary European Search Report for EP Application No. EP 7799914, dated May 28, 2010, 4 pages.

\* cited by examiner

FIG. 3 — RLE EXAMPLE 1

FIG. 4 — RLE EXAMPLE 2

FIG. 5 — BITMAP-INDEXING EXAMPLE

FIG. 6 — DELTA-ENCODING EXAMPLE

AUTOMATIC VERTICAL-DATABASE DESIGN

BACKGROUND OF THE INVENTION

Field of the Invention

The present invention is directed to automatic physical-database design.

Background Information

One of the primary features of a relational database management system (DBMS) that distinguishes it from its predecessors (network and hierarchical data management systems) is the idea of "data independence." Data independence separates the logical view of data (the logical layer) from its physical representation (the physical layer).

The benefits of data independence include ease of use (the logical layer acts as a user-friendly abstraction of the physical layer) and adaptivity (modifications at the physical layer, such as adding an index, can be made without breaking preexisting queries or designs at the logical layer).

In contrast to physical database design, with which the present invention is primarily concerned, the primary function of logical database design is to define a database schema in accordance with which the data to be managed are partitioned into a set of tables (or relations) whose attributes (or columns) the schema defines. An entity-relationship diagram is one tool that that assists with this process. A more formal approach involves normalization: an incremental process that first requires creating a "universal relation" that contains all attributes of all data, and then using functional dependencies to drive the gradual decomposition of this table into smaller (i.e., fewer-column) tables, stopping once the set of tables produced satisfies some set of constraints (a normal form). As an example, a set of tables is in Boyce-Codd normal form (BCNF) if every table, T, has the property that every functional dependency, $$A_1 \rightarrow A_2$$

consisting solely of columns found in T has $A_1$ as a key (i.e., if $A_1$ functionally determines $A_2$, it functionally determines all columns in T).

The goal of normalization is to produce a logical design that is complete while guarding against inconsistency errors. A logical design is complete if it is always possible to faithfully reproduce the universal relation from the relations in the decomposition by using a single query. Inconsistency errors are prevented by ensuring that a given attribute appears only in a table whose key functionally determines it.

The present invention is concerned not so much with such logical-design elements as it is with physical database design, which affects how much storage space the data require and how quickly they can be updated and retrieved. The physical-database-design task involves balancing the competing efficiency concerns of data retrieval and data updates. The tasks related to physical database design include:
  (a) Clustering: What relations and segments are stored on which sites?
  (b) Index Construction: Which tables should be indexed and on what fields?
  (c) Materialized Views: What query results should be precomputed and automatically updated as underlying relations get updated?
  (d) High-Availability Options: Should crash recovery be enabled by turning on logging, or by maintaining a mirror?

Although the responsibility for producing a physical database design from a logical design typically falls to a database administrator (DBA), tools have been developed to automate much of that task. One example is IBM's DB2 Design Advisor tool as described in Valentin et al., "DB2 Advisor: An Optimizer Smart Enough to Recommend Its own Indexes," Proc. ICDE Conf. 2000, pp. 101-110, and in Zilio et al., "DB2 Design Advisor: Integrated Automatic Physical Database Design," Proc. $30^{th}$ VLDB Conference, Toronto, Canada, September, 2004, pp. 1087-97. That design tool selects among candidate combinations of indexes, materialized views, partitionings, and multi-dimensional clusterings in accordance with a cost model the same as the one that the DBMS's optimizer uses when it selects among indexes in an existing physical design to implement a query.

Another example is the AutoPart tool, described in Papadomanolakis et al., "AutoPart: Automating Schema Design for Large Scientific Databases Using Data Partitioning," Proc. 16th International Conference on Scientific and Statistical Database Management (SSDBM 2004), Santorini Island, Greece, June 2004, pp. 21-23. That tool deals particularly with partitioning. It uses a set of example queries to identify optimal vertical and horizontal partitionings: certain groups of columns are stored separately from other groups of columns (vertical partitioning), records are in some fashion assigned to categories, and the record fragments in a given vertical partitioning are stored separately in accordance with their categories (horizontal partitioning). Moreover, the AutoPart tool makes partitioning determinations separately for different categories so that the vertical partitioning used for records of one category may differ from other records' vertical partitioning.

SUMMARY OF THE INVENTION

Although these design tools do tend to reduce the effort that physical-layout design requires, we have recognized that, in the context of vertically stored databases, the database-design tool's effectiveness can be enhanced by having it compare costs that result from using different compression formats to store the same logical column. By evaluating the costs associated with different compression formats, the system can enhance the degree to which the DBMS realizes the potential that laying databases out vertically affords.

For example, consider an embodiment in which the database's physical layout is to be designed to store data redundantly among a distributed storage system's plurality of sites in such a manner as to make the data k-safe, i.e., in such a manner that all data can be recovered so long as no more than k sites are down. Suppose that this embodiment accepts as input a training set of representative queries, a space budget for every site's available disk space, the safety threshold k, and the logical relational schema whose physical layout is to be determined. Given that the design must be k-safe, the design needs to specify characteristics of at least k+1 physical versions of each logical column. For each such version of each column, this embodiment produces a directive that specifies:
  the site where that version is stored,
  the order ("sort order") in which data appear in that version, and
  the compression format to be used for that version.

If the embodiment is such as to permit different physical versions of the same logical column to be stored with different compression formats, for example, it may turn out to be most effective to use, say, run-length coding on a version in which that column is sorted in accordance with its own values, arithmetic coding on a version in which that column is sorted in accordance with the values of one of the other columns, and no compression at all on a version in which that column is sorted on yet another column's values. Even if an embodiment is so designed as to constrain all versions of a given logical column to have the same compression format, the database designer's evaluation of different compression schemes for that column can result in an optimum selection of that single compression scheme.

BRIEF DESCRIPTION OF THE DRAWINGS

The invention description below refers to the accompanying drawings, of which:

FIG. 3 is a diagram that illustrates one example of run-length encoding;

FIG. 4 is a diagram that illustrates run-length encoding over "buckets";

FIG. 5 is a diagram that illustrates bit-map encoding;

FIG. 6 is a diagram that illustrates delta encoding;

DETAILED DESCRIPTION OF AN ILLUSTRATIVE EMBODIMENT

Figure 1:
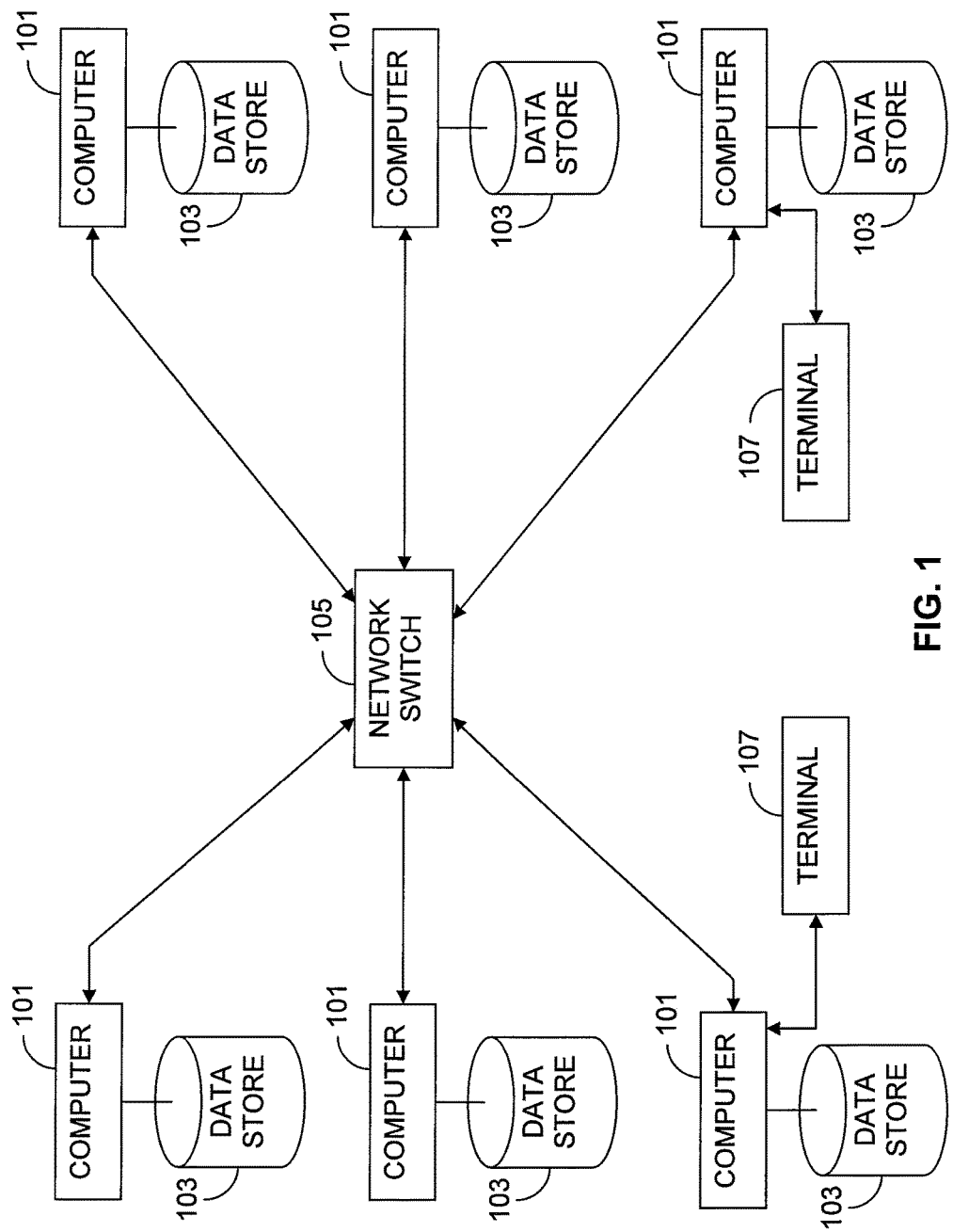
FIG. 1 is a block diagram of one type of storage system in which the present invention can be practiced.

The present invention's teachings are applicable to a wide range of database systems implemented in essentially any type of computer system. But we will assume for the sake of concreteness that it is being implemented in a system of the type depicted in FIG. 1, where each of a plurality of networked computers 101 has direct access to a respective storage device 103 and communicates over a network through a network switch 105 with the other computers, through which it can indirectly obtain access to the data on those other computers' storage devices. To perform a query, a user employs terminal equipment 107 such as a keyboard and monitor coupled to one of the computers to communicate with a DBMS process that is executing on that computer. That process performs the query by accessing its own storage device 103 and/or those of other computers.

The process that responds to the query needs to know where existing data are located and new data should be stored. For this purpose it relies on a database design that in the illustrated embodiment has been generated automatically during design operations that recur so that the data's physical layout will respond to changes in the data it is to store. Ordinarily but not necessarily the computer system that performs the automatic physical-layout operation comprises one or more of the same computers 101 that execute the queries, so one or more of the storage devices 103 typically contains programming that configures one or more of the computers 101 to perform physical-layout design in the manner that we now describe.

Aspects of the present invention find particular application in systems that employ a plurality of storage "nodes," which the network storage devices 103 exemplify, whose availabilities are to some degree independent of each other. Among the purposes of most of the present invention's embodiments will be to store data on different such nodes redundantly so that the data can be available even when not all storage nodes are. In some installations, the different nodes may simply be different physical drives in an array treated by a server's operating system as a single logical device. More typically, a storage component will be considered a different node if access to it must be obtained through a different computer. Or a storage device may be considered part of a different node only if it is powered from a different source and/or is located in a different room, a different building, or even a different city. That is, the degree of independence required before different components are considered to belong to different nodes may not be the same in all of the invention's implementations. The general concept, though, is that there must be some degree of independence between different components' availabilities if they are to be considered to belong to different nodes.

Now, although the embodiment to be described below as exemplifying the invention's teachings is intended to implement such redundancy, not all of the invention's aspects require redundant storage. But all of the invention's embodiments will employ a "column-store," or "vertical" physical-storage design. A column store differs from the more traditional row store architecture in that data in a column store are clustered on disk (or other persistent storage) by column, rather than by row.

Figure 2:
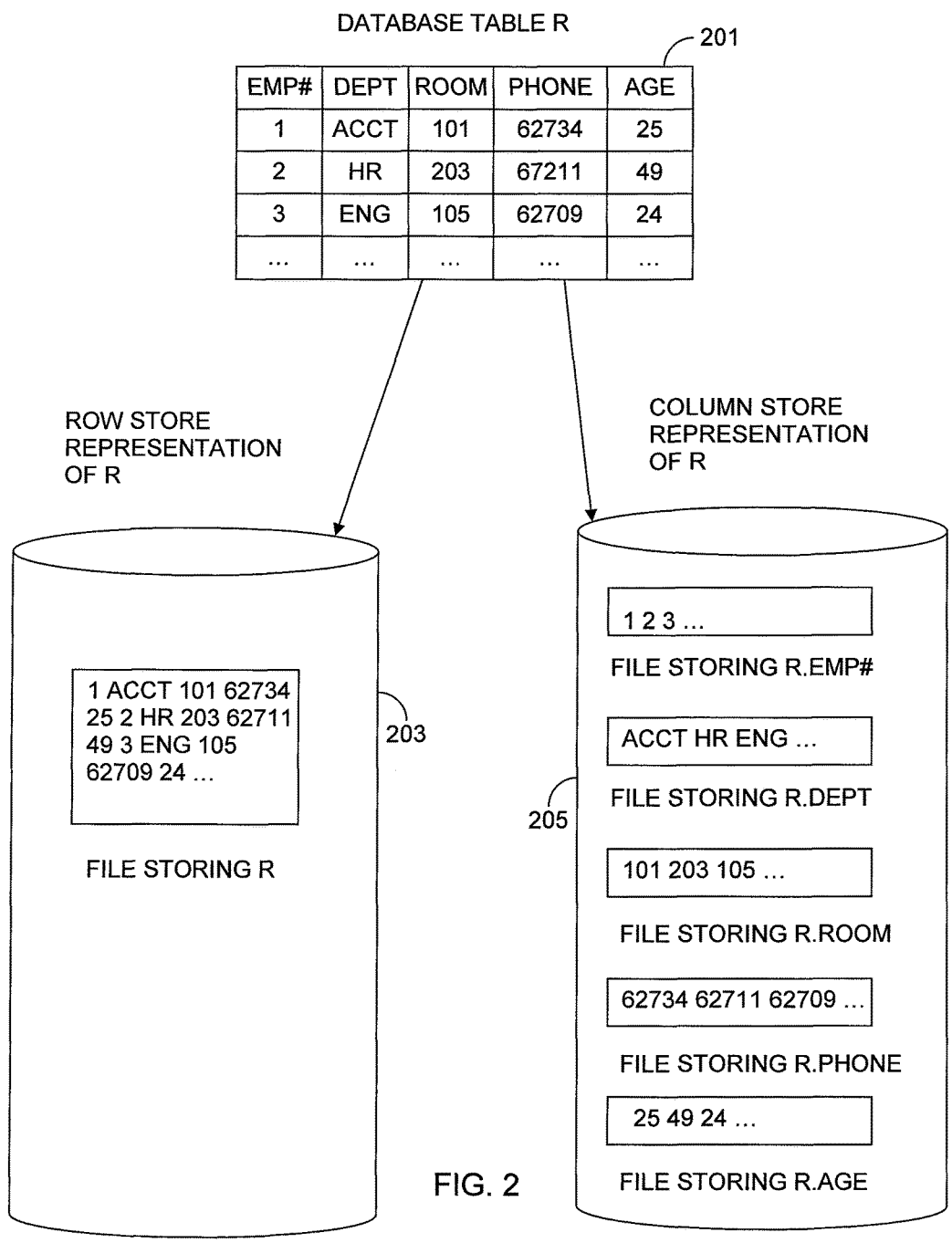
FIG. 2 is diagram showing the relationship between a logical database design and two types of physical-layout design.

FIG. 2 illustrates this distinction. A logical database design usually comprises one or more conceptual tables such as FIG. 2's table 201. A table is characterized by a set of attributes, usually depicted as column headings, for which each record in the table has respective (albeit potentially empty) values. In Table 201, for instance, the attributes are Emp# (employee number), Dept (department), Room, Phone, and Age. In conventional, horizontal storage arrangements, values of a given record's successive attributes are typically stored physically adjacent to one another, as FIG. 2's depiction of row store 203 suggests. The row-store representation of the logical table stores the table contents in a single file, in which the values are stored in the following order: row 1 (Emp#), row 1 (Dept), row 1 (Room), row 1 (Phone), row 1 (Age), row 2 (Emp#) etc. In other words, the table is stored in a manner reflecting visiting the table's contents by reading each row from left to right and then moving to the next row. The order of rows can be arbitrary, or can be based on a given set of attributes, in which case the table is effectively sorted before it is stored onto disk.

Horizontal data storage has been the traditional physical-storage approach, in part because it makes initial storage of an individual record relatively fast; to store a given record usually requires access only to, say, a single disk block. But there are a great many databases in which reading occurs much more frequently than writing. For such databases, it is often better for the physical layout to be vertical, as FIG. 2's column store 205 depicts: successive storage locations are occupied by different records' values of the same attribute. Unlike row store 203, which would typically store the entire table in a single file, a column store 205 is usually implemented by storing each column in a separate file. Thus, there is a file for the Emp# column, with values appearing in order of: 1st row, 2nd row, 3rd row etc, a file for the Dept column, with values also appearing in order of: 1 st row, 2nd row, 3rd row, and so on.

One reason why a vertical storage arrangement is preferable for data reading is that fetching the results of a query requires access to only enough, say, disk blocks to contain the values of the attributes of interest; there is no need to access enough disk blocks to contain all of the attributes of all of the records that meet the query criteria.

To appreciate another reason why "vertical," row-store physical designs can be preferable, it helps to recall that a key design choice for both row stores and column stores is the order in which rows or columns are stored. For example, FIG. 2's table 201 may be ordered in a row store on attribute Room, in which case that table's first row (Room=101) would be followed by the third row (Room=105) followed by the second row (Room=203). The choice of sort order strongly influences both query and update performance. For example, if the table is physically sorted on Room, then queries that include predicates on Room can be evaluated without scanning the entire table, either by performing a binary search, or, more commonly, by using a sparse index that typically is placed over the sort attribute. A common choice of sort order for a table in a row store is that of its primary key, since this makes it easier to enforce key constraints during insertions and updates.

Whereas in a row store a table is typically stored in a single file, in a column store it is typically stored in several files, one per table column. This makes it possible to store some of a table's columns in one sort order and others in a different sort order. This approach gives a DBMS greater leverage in exploiting sort orders when it processes a query. Doing so requires an additional data structure (a permutation) to map a given row's value in one column to its value in a different column sorted in a different order. But note that, given two sets of columns from a table:

$S_1 = \{C_1, \ldots, C_j\}$, sorted on attributes $A_1, \ldots, A_n$ (written as $C_1, \ldots, C_j | A_1, \ldots, A_n$), and
$S_2 = \{C_{j+1}, \ldots, C_k\}$ sorted on attributes $B_1, \ldots, B_m$ ($C_{j+1}, \ldots, C_k | B_1, \ldots, B_m$), a single permutation suffices to map all columns in $S_1$ to the corresponding values from columns in $S_2$. $S_1$ and $S_2$ are examples of projections: sets of columns that are sorted on the same sort order.

Put another way, column stores offer finer-grained control of redundancy than do row stores. A column store can be arranged to replicate all of or none of a table's columns. For example, a column store can replicate (in different sort orders) only those columns that occur most often in user queries.

Another factor that contributes to efficiency in fetching data from a vertically arranged database is the fact that successive values of the same attribute—that is, successive column entries—tend to lend themselves better to data compression, so that the total storage occupied by a given attribute's values tends to be less in a vertical storage arrangement than in a horizontal arrangement. An opportunity for compression can arise, for example, when a column containing a large number of records' values of a given attribute is sorted on that attribute but the number of that attribute's possible values is small.

One way of compressing a column thus stored is to use run-length encoding, which FIG. 3 illustrates. FIG. 3's diagram 301 depicts a single column representing various values of attribute A. Although that column contains the values from eleven different records, the number of distinct attribute values is only three, so the data can be compressed into the form that diagram 303 depicts, where each row represents a (value, starting position, length) triple. In that diagram, the first row indicates that a run of the value 1 begins at the first location in the uncompressed column and continues for five rows, the second row indicates that a value-4 run begins in the sixth row and extends for three entries, and the third row represents a value-5 run beginning at the ninth row and continuing for three entries.

FIG. 4 depicts another example of run-length encoding, this one used to represent the attribute-B values in that drawing's diagram 401. The records of that diagram are sorted primarily in accordance with their attribute-A values and only secondarily in accordance with their attribute B values. In such a case, the run-length encoding could include multiple entries for the same value. For example, diagrams 403, 405, and 407 represent the run-length codes for the sub-columns, or "buckets," of attribute-B column 409 that correspond to the attribute-A values 1, 4, and 5, respectively.

FIG. 5 depicts another type of compression, this one often being preferable for columns not sorted on those entries' values if the number of distinct possible entries is low. Diagram 501 represents an uncompressed column, where each entry may be a multi-byte value. As in the examples of FIGS. 3 and 4, the number of entries in that diagram is large in comparison with the number of different entry values. As diagram 503 indicates, such a column can be compressed into a series of bit maps, one for each distinct value. Although diagram 503 appears larger than diagram 501, each of the entries in the column that diagram 503 represents is potentially a multi-byte value, whereas each bit-map entry is only a single bit. Each row in diagram 503 represents one of the four possible values that column 503 contains, and each column represents one of the entries. For example, diagram 503's second row represents the value 2, so the fact that that row contains only a single 1, namely, in its fifth-column entry, indicates that the only entry in column 501 whose value is 2 is the fifth one.

FIG. 6 depicts yet another encoding example, this one being well suited to columns that are sorted on their values and the number of such values is not significantly smaller than the number of column entries. In such column versions, the differences between successive records' values tend to be relatively small in comparison with the values themselves, and the FIG. 6 encoding scheme takes advantage of this feature. In FIG. 6, diagram 601 represents the uncompressed column, and diagram 603 represents the compressed version. Diagram 603's first entry is identical to diagram 601's, but diagram 603's second entry represents the difference between diagram 601's second entry and the immediately preceding, first entry, and all of diagram 603's remaining entries similarly represent the differences between the corresponding diagram-601 entries and the entries that respectively precede them.

We have chosen the run-length, bit map, and delta encoding techniques of FIGS. 3, 4, 5, and 6 as examples because they lend themselves most readily to illustration. However, embodiments of the present invention may use any other compression technique known to those skilled in the art. Examples are Lempel-Ziv and entropy techniques, such as Huffman encoding, arithmetic encoding, enumerative encoding, etc.

We now turn to the overall task that the illustrated embodiment performs. From time to time during a database's use, the database-management system will consider the question of what the system's physical layout should be.

The input to the system's automatic physical-layout designer includes at the very least the database's logical design. Specifically, it includes a list of base tables and, for each base table, a list of attributes whose values that table's various columns are to contain, and usually the data types that are to be used to represent those values. Also, the logical design may specify the key attribute or attributes, i.e., the attribute or combination of attributes of which no two records are permitted to have the same values. In an employee table, for example, in which each record represents a different employee, the employee number will typically be the key attribute.

In some cases, the database's description will also include some statistical information either known a priori or learned through database use. This would almost always include at least how many records ("rows") the system contains for each logical table. It may also indicate whether a given attribute has relatively few different values, etc. Another input to the database designer will be a set of training queries, typically but not necessarily ones that have been submitted previously to some version of the database whose physical layout is being designed (or re-designed). The designer will have as a goal to arrive at a physical layout that in some sense optimizes database operations for such queries.

The physical-layout designer also needs to know how much storage space is available to contain the database as well as how much storage the data currently occupy. Moreover, the illustrated embodiment, which is intended to produce designs in which storage is redundant, needs to know the number of independent storage nodes and their capacities. It additionally takes as an input parameter the number, which we refer to as k, of nodes whose simultaneous lack of availability the resultant design should be able to tolerate and still accord access to all data.

From this input information, the database designer determines, for each column in the database's logical design, the nodes where versions of that column will be stored and those versions' respective sort orders. The illustrative embodiment also chooses a compression format for each column version.

The procedure that the illustrated embodiment follows in doing this is to build the physical design by incrementally adding projections in a manner that will be described below. Again, the physical layout is that of a column store, and a given projection's different columns will typically—although not necessarily—be stored in separate respective files, but the illustrated embodiment nonetheless treats the projection as a unit for physical-design purposes. (As will be seen below, not every embodiment will store all of a given projection on a single node, but it simplifies the discussion to assume initially that the illustrated embodiment is one that does.)

As will now will be explained, the database designer identifies successive table projections that will achieve the greatest improvement in training-query performance. For each projection thus identified, it decides upon a node where that projection is to be stored, and it additionally specifies k further projections, all of which contain the same columns in potentially different sort orders, and these further projections will be stored on different other nodes in order to implement the "k-safety" constraint, i.e., the requirement that all data remain available so long as no more than k nodes are down.

Figure 7:
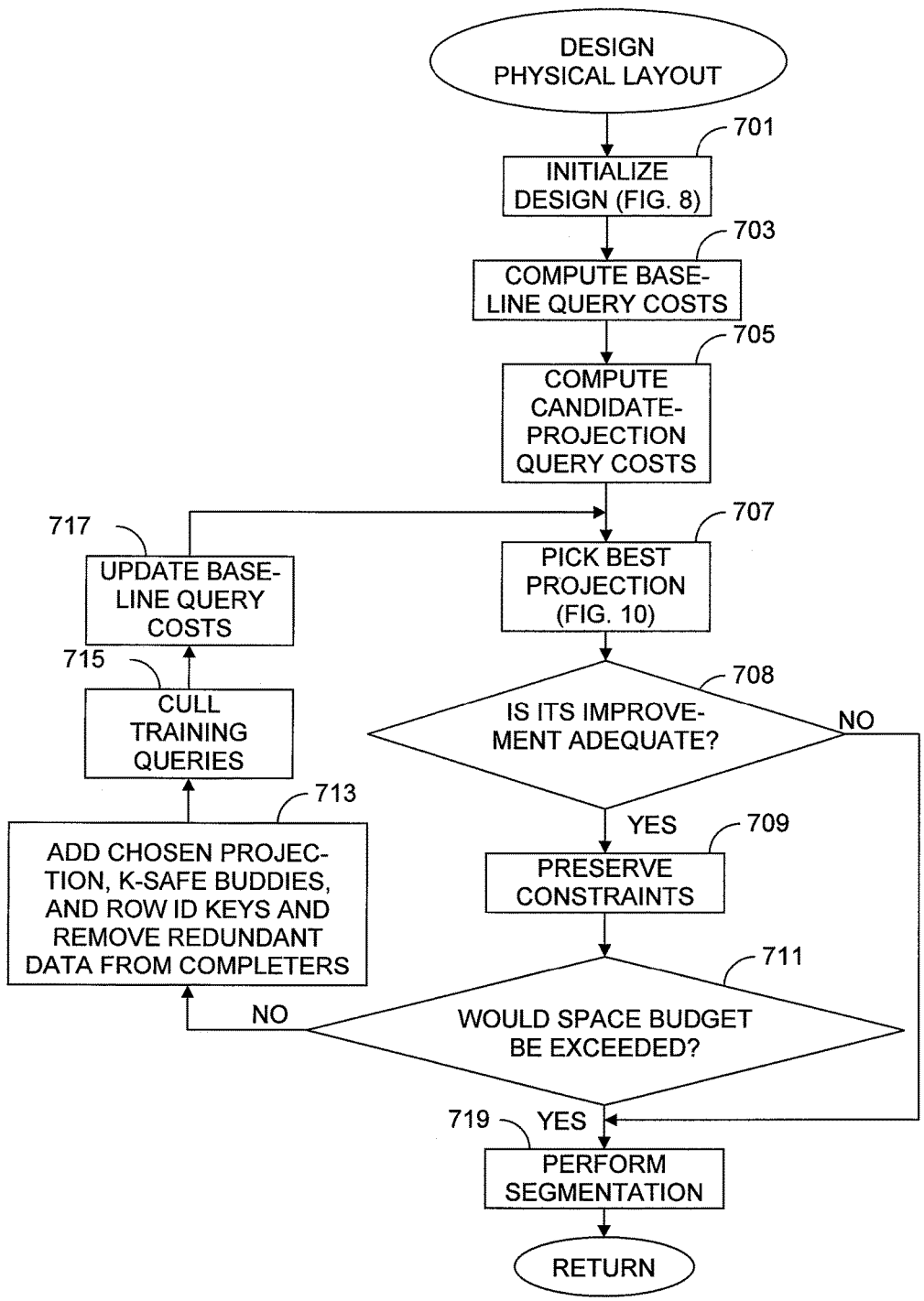
FIG. 7 is a flow chart of a physical-layout-design method that employs the present invention's teachings.
Figure 8:
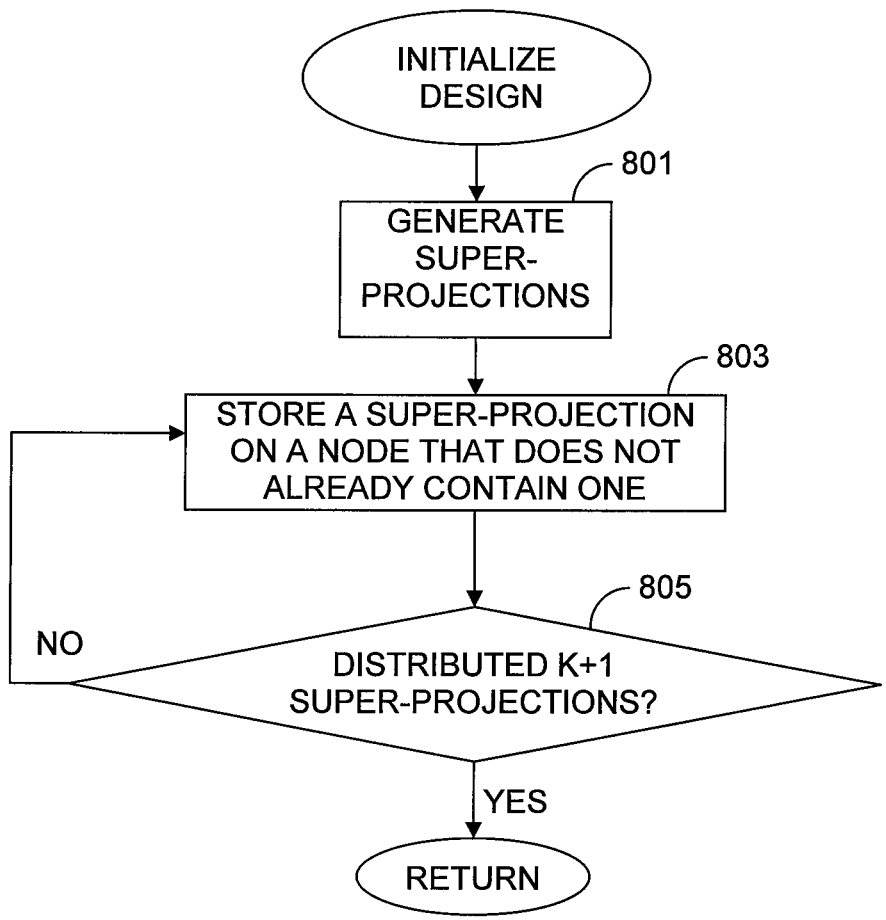
FIG. 8 is a flow chart of FIG. 7's design-initialization operation.

FIG. 7 illustrates the algorithm that the illustrated embodiment employs to implement this approach. Block 701 represents performing an initialization operation, which FIG. 8 depicts. As FIG. 8's block 801 indicates, the first operation is to generate for each base table a "super-projection," which is a projection that contains the data from all of that table's columns. The illustrated embodiment generates k+1 super-projections for each table and, as blocks 803 and 805 indicate, disperse each logical table's k+1 super-projections among k+1 different nodes. We will call the set of projections produced in this step the completers since they represent a default, complete design. In others of the invention's embodiments, it may be that not every completer is an individual base table's super-projection but is instead, say, a join of such tables. In any event, the completers together contain at least k+1 copies of all the data, and the remainder of the operation refines this design.

To that end, the system assigns to each of the design queries an estimate of the cost of executing such a query on the initial design. In most respects, the way in which the system determines such costs is not critical to the invention, and most embodiments will employ an approach that is based to a greater or lesser degree on the approach used by that database management system's "optimizer." The optimizer is the database management system's component that determines how a query is to be implemented. All database-management systems translate queries into algorithmic access plans that get compiled or interpreted into the code whose execution fetches the data that the query specifies. The process of translating a query into an access plan is called query optimization, and the most common paradigm for query optimization is cost-based query optimization.

Given a query q, cost-based query optimization follows three steps to produce an access plan for q. First, the optimizer applies some heuristics to generate a set of candidate access plans, each of which could be used to evaluate q. Next, a "cost model" is used to estimate the cost of each candidate access plan. A cost model is a set of formulas that rely on statistical information about data contained in the database to predict the cost of an access-plan operation. Typical statistics that determine cost include the relation's cardinality, a given attribute's range and distribution, and how large any indexes over a table's attributes are. Costs are sometimes measured in estimated time to evaluate the query or in a more coarse-grained quantity, such as the estimated number of disk I/O's required to evaluate the query. Finally, the optimizer bases its choice among the candidate access plans on their estimated costs.

The cost estimation represented by FIG. 7's block 703 will likely be based on the cost model that its target database-management system's optimizer uses. In principle, this is not necessary; any cost model that maps an access plan to some numeric score can be "plugged into" the illustrated designer although unexpected results could occur if the designer's cost model does not at least agree with the optimizer's assessment of which plan's cost is greater. But there is one factor that is of importance to certain of the invention's aspects. In a system that uses column stores that store overlapping projections in different sort orders, the sort order in which columns are stored heavily influences the cost of evaluating the query. There are two reasons for this. One, of course, is that a query that uses the values of a given column's attributes in a predicate will tend to be executed most efficiently on a physical projection ("materialized view") that is sorted in accordance with that column's values; the only values the system needs to access are those that correspond to the specified value or range. The other reason, which we have recognized as being particularly important in column stores for access-plan formulation and consequently for physical-layout design, is that, as explained above, different sort orders lend themselves to different compression formats, and an appropriate compression scheme can greatly reduce a given query's I/O cost—which in many situations dwarfs the cost of (possibly decompressing and) inspecting the retrieved values. Therefore, although a wide variety of cost models can be used in embodiments of the present invention, it is preferable that the cost model employed be one that takes into account the cost impacts of different compression formats.

Figure 9:
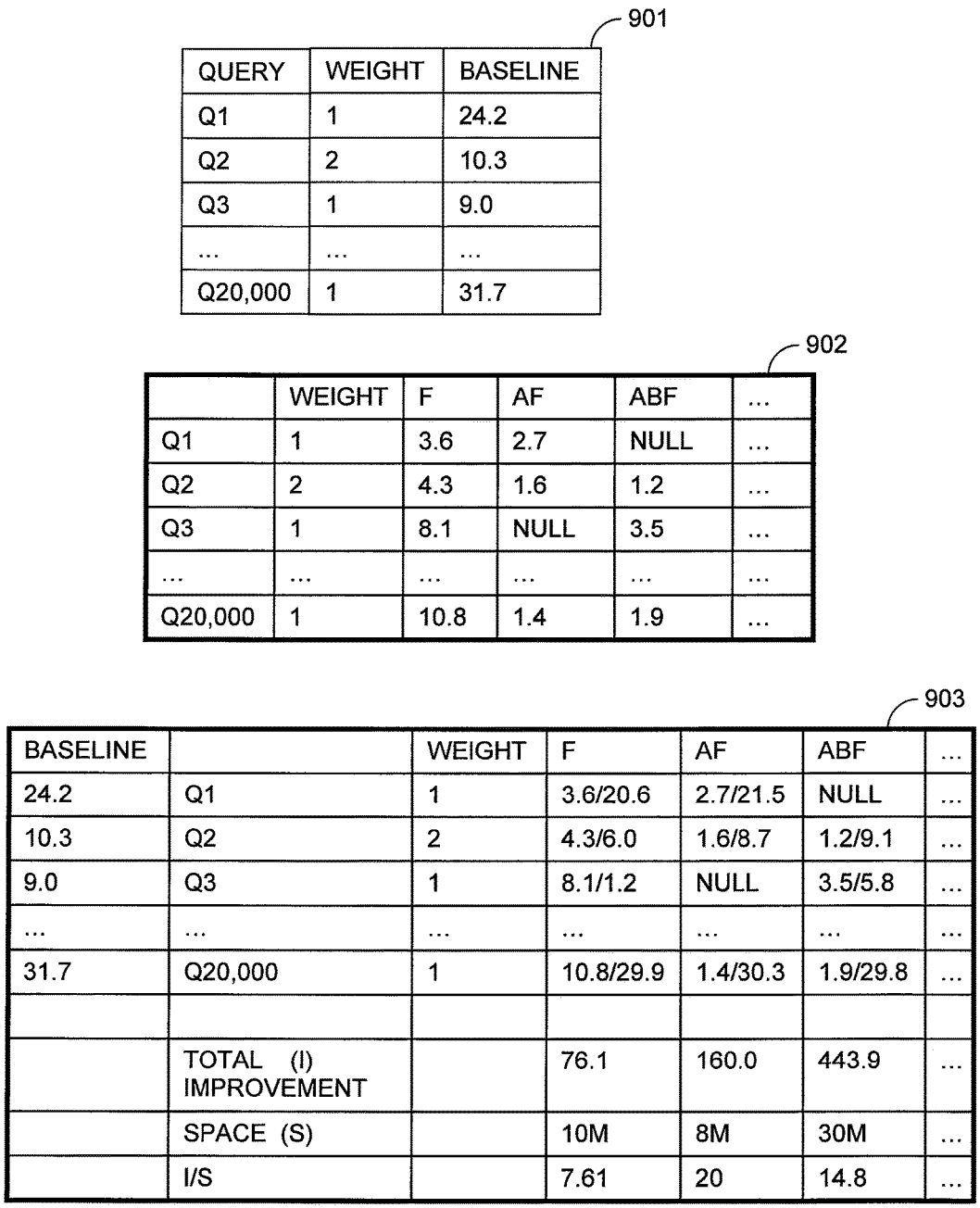
FIG. 9 is a diagram illustrating data generated in selecting projections to add to the database design.

The result of this initial cost determination can be represented by FIG. 9's table 901. Each row in that table represents one or more queries in the training set, the number of queries represented by a given row being represented by the "weight" entry. There are two reasons why a single row may represent more than one query. The first is that some queries may in fact be identical, so their costs are necessarily the same. The second reason is that other queries, although not identical, are considered the same by the cost model that the particular embodiment employs.

In the illustrated embodiment, for example, the input to the cost model for a given query would be not be the whole query but only a set of relevant characteristics. Specifically, a query is represented as a set of pairs that contains as many pairs as there are attributes used by the query. Each pair has the form (Attribute_Name, Usage) where Usage is an indicator of how the attribute is used (e.g., equalityPred, rangePred, output, GroupBy). Each attribute also has a known cardinality (i.e., few/many) that can be looked up in the system catalog. From the point of view of the cost model, the form of the query is more important than the specifics; the model may ignore constants, for example. So a query representation for $Q_i$ might be $Q_i=\{(A, equalityPred), (B, equalityPred), (D, rangePred), (E, rangePred)\}$ to indicate that $Q_i$ includes equality predicates based on attributes A and B and range predicates based on attributes D and E, and the representation may additionally include a notation that, say, A is few-valued, B few-valued, D many-valued, and E few-valued. In a training set of tens of thousands of queries, it is likely that many queries would have identical representations.

With the baseline cost of the training inquiries thus computed, the routine proceeds to the operation represented by FIG. 7's block 705, in which it computes, for various projections not yet in the current physical design, what various queries would cost if the design included those projections. One approach to doing this does not limit the projections being considered to the base tables' columns; they can extend to projections of tables derived by, e.g., joins of base tables. So, in determining what the cost of executing a query would be if a projection having a given sort order were available, the system assumes that the projection having that sort order is the projection of whatever base table or join thereof that has all the columns those queries require. (We refer to such projections of derived tables as pre-joined projections.) For inclusion in the design, that is, the algorithm considers projections of the form $A_1, \ldots, A_m | A_1, \ldots, A_k$, where $A_1, \ldots, A_m$ comprise all attributes used by a query and $A_1, \ldots, A_k$ comprise a "reasonable" sort order for the projection.

Reasonable sort order here means a small subset of all possible sort orders. Compound sort keys that have more than two or three components are not usually useful. As can be appreciated by reference to FIG. 4's diagram 401, each value of one constituent attribute in a compound sort key can be thought of as creating a bucket (i.e., grouping of values) in the next-most-significant constituent attribute. The number of buckets grows as the product of the cardinalities of the columns. Once there are more than, say, 500 buckets, the advantage of the compound sort order begins to disappear.

The cost of evaluating a query will not be the same for every reasonable sort order. So operation 705 results in a respective vector of costs for each query, each slot in the vector containing the cost of executing that query on a projection having a corresponding sort order. As was stated above, the system preferably arrives at these costs by taking the different resultant compression formats into account.

The particular approach to taking compression technique into account is not critical. For the sake of concreteness, though, we will assume that the illustrated embodiment chooses compression techniques in accordance with the following simple rule. A column that is sorted in accordance with its own values will be compressed by run-length encoding if it is few-valued and by delta encoding if it is many valued, and other columns will be encoded by bit maps if they are few-valued and by Lempel-Ziv encoding if they are many-valued. Also for the sake of concreteness, we will assume that it estimates the space occupied by the column to be a single block if it is run-length encoded, while columns compressed in accordance with bitmap, delta, and Lempel-Ziv encoding are respectively estimated to occupy twenty-five, fifty, and seventy-five percent of what they would if they were not compressed.

The cost model can use such assumptions in various ways. One workable query-cost model counts the number of disk-block accesses required to process the query. Although such determinations can be based on the queries' selectivities, our preference is to give greater priority to sort orders (including compound sort orders).

As was stated above, the result of computing the costs of a query for different sort orders is a vector of costs that includes a slot for each of its reasonable sort orders. The collection of all such vectors for all queries can be thought of as a table, which FIG. 9's table 902 represents, that has one row for each query and one column for each reasonable sort order. Let us call this table the Query Costing Table (QCT). There will be a large number of NULLs in each row of the QCT since most of the possible sort orders are reasonable for only a fraction of the training queries.

Each of that table's columns can be thought of in several ways. First, each represents a sort order. Second, each represents a physical projection of the database, the projection having the specified sort order and including the values of some (initially undetermined) set of attributes. Third, since the physical design being determined is vertical, each table represents a set of physical column versions, which set includes a single respective physical column version for each logical column in an (again, as-yet-undetermined) set thereof. Each of those physical column versions in a set represented by a given one of the table's columns is characterized by the same sort order, a different database attribute, and, since in the illustrated embodiment the combination of attribute and sort order determines compression format, a respective compression format (which format could be no compression at all, although in the illustrated embodiment it never is). So, by making that list of sort orders, the system has in effect made a list of physical column versions, and at least some of the listed versions of the same logical column differ from one another not only by sort order but also by compression format.

Figure 10:
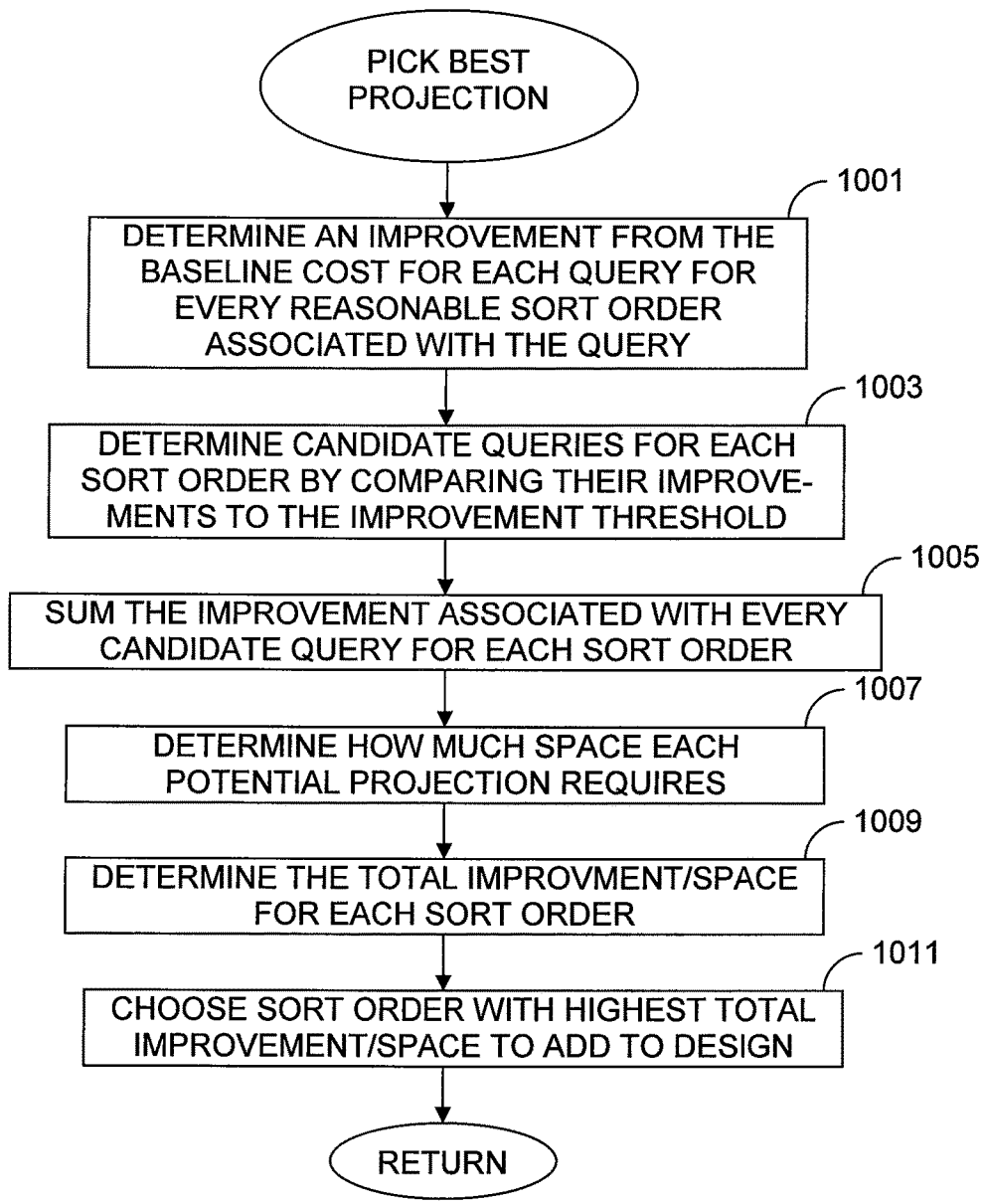
FIG. 10 is a flow chart of FIG. 7's best-projection-selection operation.

In an operation represented by FIG. 7's block 707 and depicted in more detail in FIG. 10, the physical-layout designer next picks the best projection to add to the current design. To do so, it computes some additional statistics on the QCT. As block 1001 indicates, it determines, for each of the cost cells in FIG. 9's table 902, an improvement over the baseline cost for that query, i.e. over the cost under the current design. FIG. 9's table 903 shows these improvement values after slashes in the cost cells; in the entry for $Q_1$ and sort order F, for example, the entry after the slash indicates that, if a projection having all the columns $Q_1$ needs and sorted on F were added to the physical-layout design, the improvement in query $Q_1$'s execution cost would be 20.6.

As FIG. 10's block 1003 indicates, the illustrated embodiment then compares these improvement to an Improvement Threshold (IT), which is the minimum improvement that a sort order must provide a query in order for that query to be considered in determining which columns need to be in the candidate projection that has that sort order. Suppose that the IT is 10.0 in the example. As FIG. 9's table 903 indicates, the F-sort-order entries for $Q_1$ and $Q_{20,000}$ exceed that threshold and thus are candidates for use in determining the columns to include in a projection having sort order of F. Call any such query a candidate query. As FIG. 10's block 1005 indicates, the system then, for each sort order, adds together the improvements for all of that sort order's candidate queries. The "Total Improvement" row in FIG. 9's table 903 represents these results.

At this point in the process, there has been identified for each sort order the set of queries whose performance would be improved by at least IT if projection of that sort order were added to the design. From that set of queries, the illustrated embodiment determines what columns a projection having that sort order would need to include to provide such improvements, and, as FIG. 10's block 1007 indicates, it estimates the space each such potential projection would require. The illustrated embodiment does this by applying a simple space model that takes compression format into account in the manner mentioned above. The "Space" row in FIG. 9's table 903 represents the resultant space estimates. As FIG. 10's block 1009 indicates, the space value is used to compute the ratio of total improvement to space for each such projection. The "I/S" row in Table 903 represents those ratios. FIG. 10's block 1011 represents choosing for inclusion in the design the potential projection having the highest such ratio. In the FIG. 9 example, the highest ratio is associated with sort order AF, so the potential projection having that sort order is the one chosen as the output of FIG. 7's operation 707.

As FIG. 7's block 708 indicates, some embodiments may refrain from adding a projection to the design if that ratio is not great enough to justify changing the design. The assessment of what is "great enough" may, for example, be based on whether the resultant increase in access performance justifies the additional cost of updating that adding a projection exacts. Even if the ratio is great enough, moreover, the selected projection is added to the design only if that can be done consistently with k-safety without violating the space budget. So the system performs an operation represented by FIG. 7's block 709, in which it develops a proposed new design based on the selected projection in order to make that determination.

Figure 11:
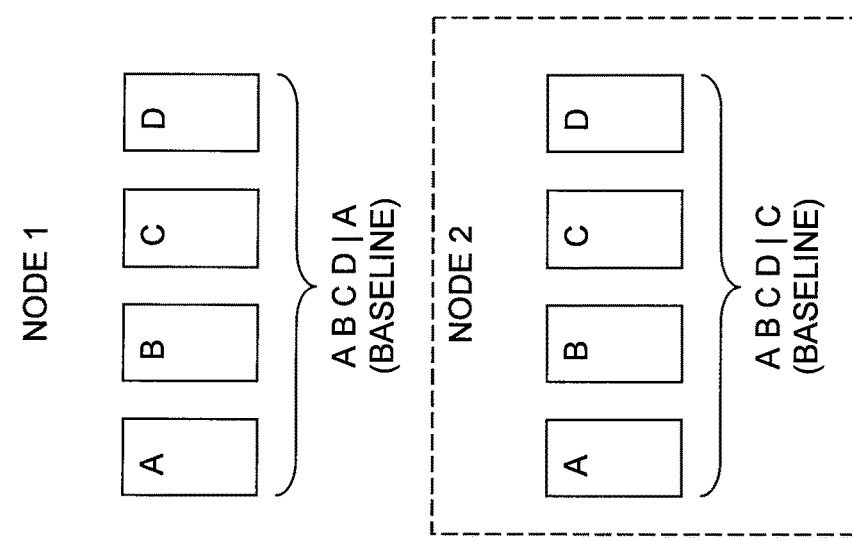
FIG. 11 is a diagram that illustrates an original baseline design.

To give an example of how the illustrated embodiment performs that task, we will assume for the sake of simplicity that the base logical design consists of only a single table, that the single table is characterized by four attributes A, B, C, and D, that the physical storage system consists of only two nodes, and that the safety parameter k is unity, i.e., that the layout will be designed to preserve access to all the data if as many as one node goes down. FIG. 11 illustrates the resultant baseline design, in which each node contains a respective file for each of the logical columns: each contains a "super-projection" of the base table. We will assume that first and second nodes' projections are respectively sorted on A and C: the two baseline projections are ABCD|A and ABCD|C.

Figure 12:
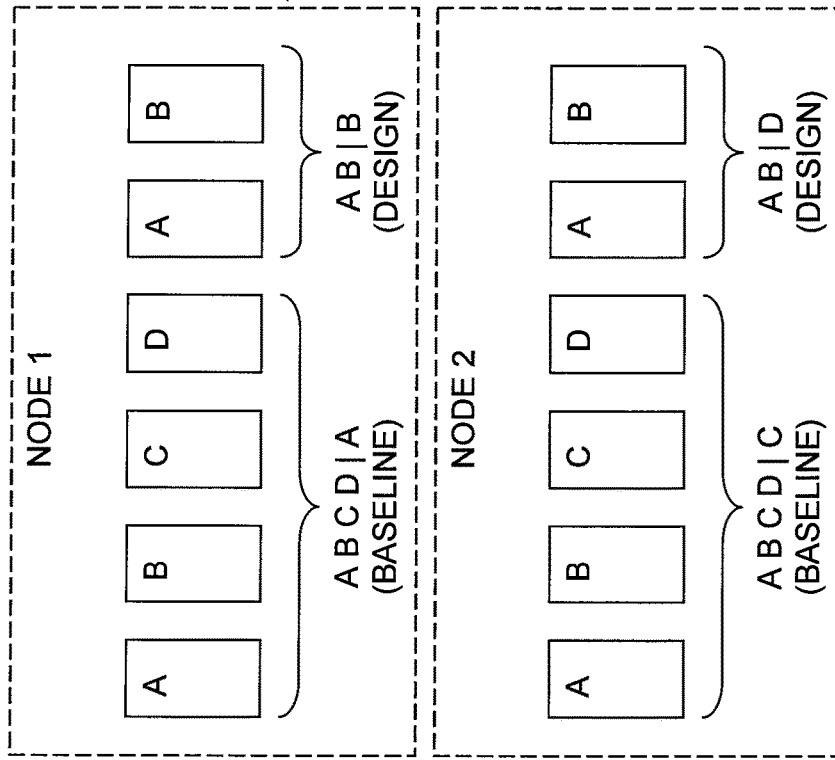
FIG. 12 is a diagram that illustrates an intermediate step in adding a projection to the original design.

Now suppose that the projection selected by FIG. 7's operation 707 is AB|B. For k-safety purposes, that dictates adding such a projection to one of the nodes and "k-safe buddy" projections—i.e., projections including the same columns—on k other nodes. The "buddy" projections' sort orders can be the same as the sort order selected in operation 707, but it is often better if they differ. For example, their sort order can be chosen to be the ones for which the next-highest improvement-to-space ratios were computed. Since k in this example is unity, that means adding the selected projection and one k-safe buddy, as FIG. 12 illustrates.

Figure 13:
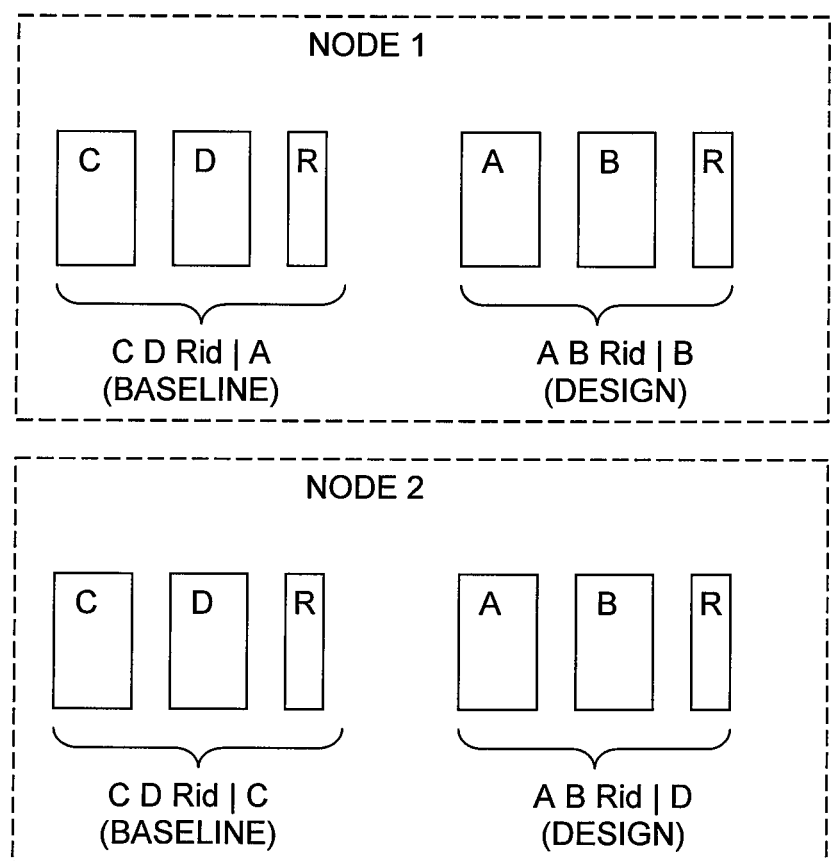
FIG. 13 is a diagram that illustrates the result of adding that projection.

Thus siting an additional projection on a given node will usually make the data in the same node's corresponding completer columns redundant, and some embodiments, such as the illustrated one, may elect to eliminate that redundancy by removing that completer column when such redundancy occurs. To retain the capacity to recreate the original relation, though, row-ID files will sometimes have to be provided for the resultant projections. FIG. 13 depicts the result. Although FIG. 13 shows a row-ID file for every projection, that is not usually necessary if the row ID is taken to be the row's physical position in the stored sequence.

As FIG. 7's block 711 indicates, the system determines whether that proposed design exceeds the space budget. If so, the selected projection and its k-safe buddies are not added to the design, and the design process is finished (except for one further operation, which will be described in due course). Otherwise, as block 713 indicates, that proposed design becomes the current one.

Having added a projection (and its k-safe buddies) to the design, the physical-layout designer can turn to identifying a further projection to add. Before it does so, though, the illustrated embodiment performs an operation represented by block 715, in which it removes from the training-query list the queries that were used to determine the columns for the just-added projections. This is not necessary, but we consider it beneficial, since the existing projection additions have already improved performance for those queries significantly, and removing them makes subsequent operations concentrate on improving the performance for other queries. Some further queries can also be removed from the list at this point. Suppose, for example, that the cost-computation operation had identified some training query whose cost improvement under the first selected sort order did not exceed the improvement threshold but its improvement under one of the k-safe buddies' sort orders did. If the selected projection (and therefore each of the k-safe buddies) includes all of the columns required by any such query, then they, too, can be removed from the training-query list.

With the query list thus culled and the baseline design thus updated by the selected projections' additions, the designer updates the query costs for the new baseline design, as block 717 indicates, and the operation of finding another projection to add is repeated in the manner described above until one of the criteria for termination is satisfied.

Now, the assumption was stated above that each selected projection is stored completely on a single node, and it was tacitly assumed that each of its k-safe buddies also is stored completely on a respective (but different) node. In an embodiment that operates in that fashion, the design is complete when one of the termination criteria described above is met. The system then proceeds to store the data in accordance with the design, and queries are executed on the new materialized views when that storage operation has been completed. (If the new design is being adopted during use of the database, a set of data complying with the previous design is typically retained and used to execute queries until data laid out in accordance with the new design are all in place.)

However, there are reasons why some embodiments may instead divide a projection's data among a plurality of nodes. For example, each storage device in a system of the type that FIG. 1 depicts is directly accessible only by a single respective different computer, and it is often preferable for more than one computer to be executing different parts of the same query in parallel. In such a situation, it is also desirable if, although all parallel-operating computers should operate on the same physical projection, they operate predominantly only on the data that reside in the respective, different storage devices to which those computers have direct access. This can be accomplished only if that projection's data are divided among those different storage devices.

So some embodiments will partition projections horizontally for the purpose of spreading the data out across multiple nodes. (The number of nodes among which a given projection is to be divided may, for example, have been set as a parameter when the automatic database designer was first being installed, or it may, say, be inferred in accordance with some rule from the host system's physical configuration.) We use the term segmentation to refer to such horizontal partitioning. Although such segmentation can be done at each step for that step's selected projection and its k-safe buddies, FIG. 7's block 719 depicts it as instead being performed after all the projections have been selected.

Segmentation of a given projection is performed on the basis of some column or set of columns and may be accomplished in accordance with, say, hash functions, ranges, or simple value mappings. The column on which a given projection's segmentation is based may be one that the projection does not directly include. For example, it is possible for (A B|A) to be segmented on a column, say, column C, that appears only in some other projection.

The approach that a given embodiment employs will likely depend on the relationship between the number of nodes and the number k of nodes whose unavailability needs to be tolerated. If the number of nodes is many times k, it may be practical to arrange the layout in such a manner that none of a given projection's segments resides on the same node as a segment of any of its k-safe buddies. In such cases, the columns on whose values segmentation is based will likely differ for different k-safe buddies.

More often, though, there will not be that many nodes. In such a case, some of a buddy's data have to be stored on the same node as some of the main projection's data, but it is preferable (in order to avoid unhelpful redundancy) for the "same data" (rows) not to occur on the same node. So buddy projections in such a situation are likely to be segmented identically to their main projection.

That is to say, if (A B|A) is segmented on A, then its buddy projection (A B|B) will also be segmented on A, even though it is sorted on B. This facilitates avoiding unhelpful redundancy if buddy projections' segments are staggered in a round-robin fashion such as the following.

|  | Site A | Site B | Site C |
| --- | --- | --- | --- |
| Projection | Segment 1 | Segment 2 | Segment 3 |
| Buddy Projection | Segment 3 | Segment 1 | Segment 2 |

When the physical-design operation is completed, it generates an output that represents the physical design, and the management-system processes use the design to re-organize the data and execute queries on it.

By employing the present invention's teachings, a database layout can be designed automatically in a way that takes particular advantage of a column store's benefits. It thus constitutes a significant advance in the art.

What is claimed is:

1. A computer-implemented method comprising:
   for each of multiple candidate sort orders of a table having rows and columns, determining a cost based on candidate training queries that have execution costs that satisfy an improvement criterion;
   based on the respective costs of the candidate sort orders, selecting sort orders at least one of which satisfies all of the candidate training queries;
   for each of the selected sort orders, adding, to a design of a database, an included projection, wherein a projection is a subset of the columns of the table sorted according to a same order, the columns of the projection to be physically stored in accordance with the selected sort order; and
   each of the multiple candidate sort orders from which the sort orders are selected defining an order with respect to a putative projection comprising a view of one or more columns that are not necessarily identical to the columns of the included projection.

2. The method of claim 1 where selecting sort orders from candidate sort orders includes determining storage space which would be required by a projection corresponding to the sort order.

3. The method of claim 2 where selecting sort orders is based on which sort order has a largest ratio of cost to storage space as compared to other sort orders.

4. The method of claim 1, further comprising segmenting the projection into a plurality of segments.

5. The method of claim 4, further comprising replicating each of the segments on a plurality of storage nodes.

6. The method of claim 5 where each replicated segment has a different sort order.

7. The method of claim 5 where a same column in each of the replicated segments is compressed according to a different compression scheme on each of the plurality of storage nodes.

8. The method of claim 1, further comprising:
   assigning to each of a plurality of storage nodes a super-projection of all tables for the database; and
   deleting from a storage node in the plurality of storage nodes a super-projection's physical column made redundant on that storage node by the addition of the projection to that storage node.

9. The method of claim 1 where the determined cost is based on an estimated time to evaluate queries or an estimated number of disk operations required to evaluate queries.

10. The method of claim 9 where the estimated number of disk operations takes into consideration compression of projections and sort orders used to execute the query.

11. A non-transitory computer-readable medium containing instructions operable to cause a computer system to perform operations comprising:
   for each of multiple candidate sort of a table having rows and columns, determining a cost based on candidate training queries that have execution costs that satisfy an improvement criterion;

based on the respective costs of the candidate sort orders, selecting sort orders at least one of which satisfies all of the candidate training queries; and in addition to any indexes for the database, for each of the selected sort orders, adding, to a design of a database, an included projection, wherein a projection is a subset of the columns of the table sorted according to a same order, the columns of the projection to be physically stored in accordance with the selected sort order; and each of the multiple candidate sort orders from which the sort orders are selected defining an order with respect to a putative projection comprising a view of one or more columns that are not necessarily identical to the columns of the included projection.

12. The computer-readable medium of claim 11 where selecting sort orders from candidate sort orders includes determining storage space which would be required by a projection corresponding to the sort order.

13. The computer-readable medium of claim 12 where selecting sort orders is based on which sort order has a largest ratio of cost to storage space as compared to other sort orders.

14. The computer-readable medium of claim 11, further comprising instructions operable to cause the computer system to perform operations comprising segmenting the projection into a plurality of segments.

15. The computer-readable medium of claim 14, further comprising instructions operable to cause the computer system to perform operations comprising replicating each of the segments on a plurality of storage nodes.

16. The computer-readable medium of claim 15 where each replicated segment has a different sort order.

17. The computer-readable medium of claim 15 where a same column in each of the replicated segments is compressed according to a different compression scheme on each of the plurality of storage nodes.

18. The computer-readable medium of claim 11, further comprising instructions operable to cause the computer system to perform operations comprising:
    assigning to each of a plurality of storage nodes a super-projection of all tables for the database; and
    deleting from a storage node in the plurality of storage nodes a super-projection's physical column made redundant on that storage node by the addition of the projection to that storage node.

19. The computer-readable medium of claim 11 where the determined cost is based on an estimated time to evaluate queries or an estimated number of disk operations required to evaluate queries.

20. The computer-readable medium of claim 19 where the estimated number of disk operations takes into consideration compression of projections and sort orders used to execute the query.

21. A system comprising:
    a computer-readable medium containing instructions; and
    one or more processors operable to execute the instructions to perform operations comprising:
        for each of multiple candidate sort orders of a table having rows and columns, determining a cost based on candidate training queries that have execution costs that satisfy an improvement criterion;
        based on the respective costs of the candidate sort orders, selecting sort orders at least one of which satisfies all of the candidate training queries; and
        for each of the selected sort orders, adding, to a design of a database, an included projection, wherein a projection is a subset of the columns of the table sorted according to a same order, the columns of the projection to be physically stored in accordance with the selected sort order; and
        each of the multiple candidate sort orders from which the sort orders are selected defining an order with respect to a putative projection comprising a view of one or more columns that are not necessarily identical to the columns of the included projection.

22. The system of claim 21 where selecting sort orders from candidate sort orders includes determining storage space which would be required by a projection corresponding to the sort order.

23. The system of claim 22 where selecting sort orders is based on which sort order has a largest ratio of cost to storage space as compared to other sort orders.

24. The system of claim 21, further comprising instructions operable to cause the computer system to perform operations comprising segmenting the projection into a plurality of segments.

25. The system of claim 24, further comprising instructions operable to cause the computer system to perform operations comprising replicating each of the segments on a plurality of storage nodes.

26. The system of claim 25 where each replicated segment has a different sort order.

27. The system of claim 25 where a same column in each of the replicated segments is compressed according to a different compression scheme on each of the plurality of storage nodes.

28. The system of claim 21, further comprising instructions operable to cause the computer system to perform operations comprising:
    assigning to each of a plurality of storage nodes a super-projection of all tables for the database; and
    deleting from a storage node in the plurality of storage nodes a super-projection's physical column made redundant on that storage node by the addition of the projection to that storage node.

29. The system of claim 21 where the determined cost is based on an estimated time to evaluate queries or an estimated number of disk operations required to evaluate queries.

30. The system of claim 29 where the estimated number of disk operations takes into consideration compression of projections and sort orders used to execute the query.

* * * * *